Aug. 15, 1967 S. KUFLIK ETAL 3,336,578

DETECTOR OF APERIODIC DIPHASE MARKER PULSES

Filed March 4, 1963

MARKER DETECTOR BLOCK DIAGRAM

WAVEFORMS IN FIG. 1, SYSTEM

INVENTORS
SAMUEL KUFLIK
JOSEPH C. UHLAND
BY
Robert D. Sanborn
ATTORNEY

United States Patent Office 3,336,578
Patented Aug. 15, 1967

3,336,578
DETECTOR OF APERIODIC DIPHASE MARKER PULSES

Samuel Kuflik, New York, N.Y., and Joseph C. Uhland, Merchantville, N.J., assignors to Philco Ford Corporation, a corporation of Delaware
Filed Mar. 4, 1963, Ser. No. 262,776
6 Claims. (Cl. 340—167)

This invention relates to information transmission systems, and more particularly to such systems utilizing aperiodic marker pulses which have a diphase format.

In our copending application, Ser. No. 262,776, filed March 4, 1963 (now Patent 3,241,135, granted Mar. 15, 1966), a pulse code modulation (PCM) system is disclosed for producing coded groups of digital pulses in response to analog samples of an information signal. The number of digital pulses required to represent an analog sample pulse in this system is related to the magnitude of the analog pulse. Thus, according to the PCM code, wherein sequential digital pulses and spaces (bits) are representative of decreasing powers of two, six bits are required to represent an analog pulse of 50 units amplitude ($1\times2^5+1\times2^4+0\times2^3+0\times2^2+1\times2^1+0\times2^0$), while only three bits are required to represent an analog pulse of 7 units amplitude ($1\times2^2+1\times2^1+1\times2^0$). Whereas prior art PCM systems have operated by transmitting a fixed number of digital bits for each analog sample, regardless of its amplitude, our PCM system operates aperiodically, in that only the number of digital bits actually required to encode an analog sample are transmitted. Advantage is taken of the fact that a fixed time is not required to encode each sample in the aperiodic PCM transmitter so that a subsequent analog sample is encoded as soon as sufficient pulses have been transmitted to encode the prior sample. Thus the average length of the groups of the encoded digital bits will be proportional to the average rather than the maximum amplitude of the analog samples. Hence in a time division multiplex PCM system, wherein successive channels are sequentially sampled, a reduction in the overall time-bandwidth-product requirement is obtained.

Aperiodic encoders are also extremely valuable in PCM multiplexing systems wherein large numbers of channels, for example 96 channels, are used. The probability that more than 25% or 30% of the channels will be in use at a given time is low and since only channel markers are required to represent empty channels, a great saving in bandwidth can be effected by using an aperiodic encoder.

One problem encountered in conjunction with such an aperiodic PCM system is that of synchronizing the receiver with the transmitter. Irregularly spaced marker pulses must be transmitted between the coded groups of digital pulses to separate the adjacent groups and to synchronize the decoding circuits in the receiver. These marker pulses must, of course, be dissimilar in form from the digital information-representative pulses in order that they may be cognizable by the receiver, yet not dissimilar enough to adversely increase the time-bandwidth-product requirement of the system. In addition, it is advantageous, from an economy of bandwidth viewpoint, if the form of the marker pulse used may be arranged to represent additional information in the PCM system, such as a polarity indication for an adjacent group of pulses.

Accordingly several objects of the present invention are:

(1) To provide a novel and useful method of separating adjacent groups of coded pulses,
(2) To provide a novel and useful method of synchronizing a receiver in an aperiodic information transmission system, (3) To provide marker pulses which also carry intelligence, and
(4) To provide a system for recognizing and separating the above-mentioned marker pulses.

Other objects and advantages of the present invention will become apparent from a consideration of the following description thereof and accompanying drawings.

*Summary*

According to the present invention adjacent groups of encoded digital bits are separated by a marker pulse which is a diphase signal of alternative form and double the bit frequency of the digital information separated thereby. Circuitry for recognizing and separating said marker pulse comprises means to sample, at the bit frequency, during the latter half of each cycle, a synthesized signal which is the sum of a half-phase-delayed version and an inverted version of the composite digital information signal.

*Drawing*

*Digital information signal with diphase markers—Waveform B*

Figure 2:
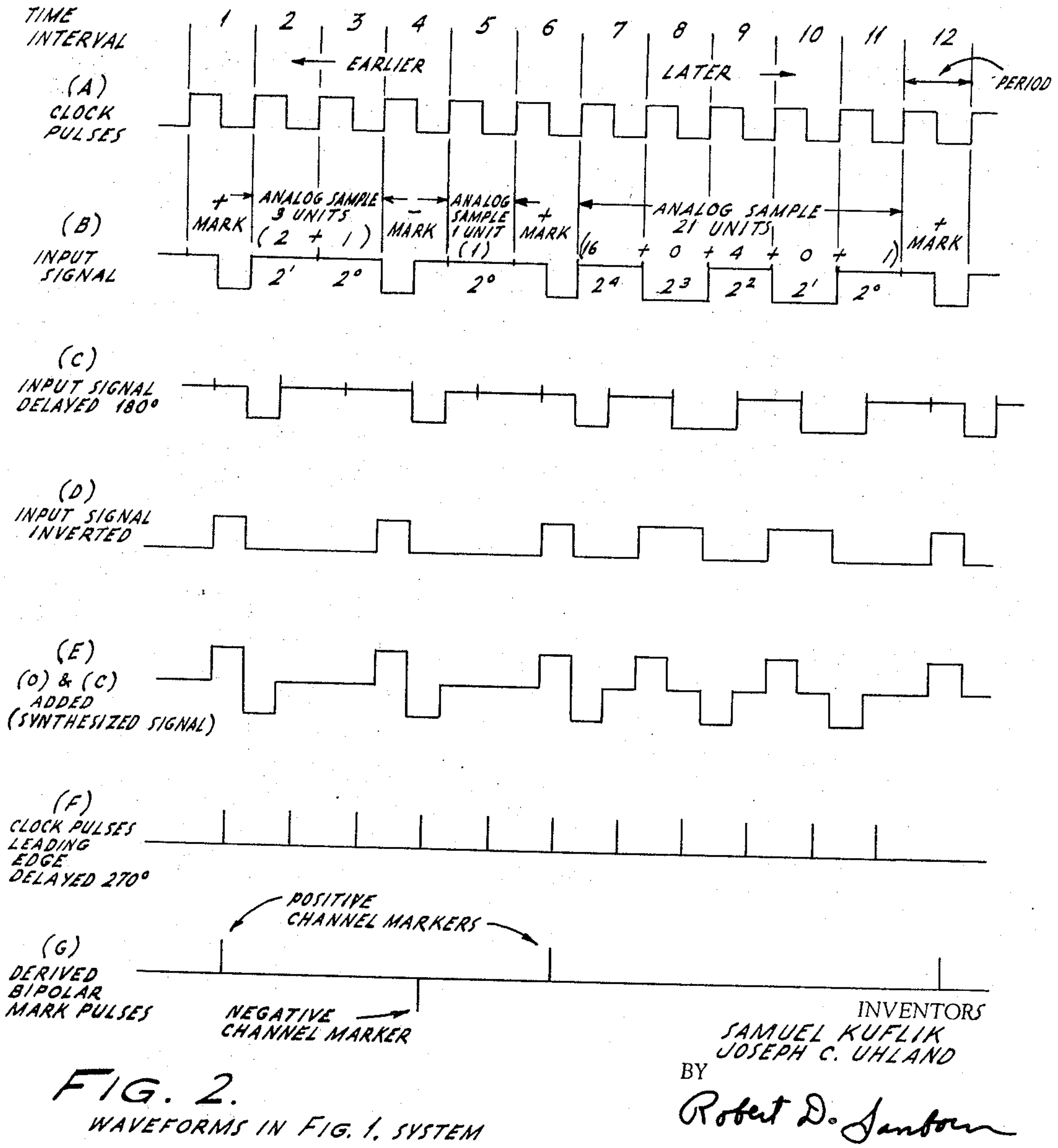
FIG. 2 is a time diagram of voltage waveforms present in the system of FIG. 1.

Reference is made to FIG. 2, waveform B, which shows a received pulse code modulated digital information signal including three pulse code groups respectively representative of the amplitude of three analog information samples, and four diphase marker pulses for separating said pulse code groups. The numbers at the top of FIG. 2 identify successive time intervals, each interval being equal to the width of one bit in the pulse code signal. During intervals 1, 4, 6, and 12 the diphase marker waveform according to the invention is present. During intervals 2 and 3 a code group comprising two digital pulse bits representative of one analog pulse sampled at the transmitting end of the system is present. Interval 5 contains a code group comprising only one digital pulse representative of another analog sample, and intervals 7 to 11 contain a code group of 3 digital pulses and two spaces (5 bits) representative of still another analog sample. The magnitude of the analog sample represented by the digital pulses in intervals 2–3 is three units since pulses are present in the $2^1$ (i.e., 2) and $2^0$ (i.e., 1) positions. The analog sample represented in time interval 5 is one unit in magnitude since only one pulse ($2^0$) is present, while the analog sample represented in intervals 7 to 11 is twenty-one units in magnitude since pulses are present in the $2^4$ (16), $2^2$ (4), and $2^0$ (1) bit positions. The three analog samples represented by the bit code in waveform B of FIG. 2 may represent samples taken of three different channels in a time division multiplex (TDM) system or three sequential samples of a single signal.

The diphase marker pulses of the invention separating the digital code groups may comprise one of two possible forms. The positive mark signal shown in interval 1 consists of a positive pulse of half the width of a bit pulse occurring during the first half of the interval. The negative mark signal shown in interval 4 consists of a positive pulse of half the width of a digital bit which occurs during the latter half of the interval. The functions of the mark pulses are to: (1) separate adjacent digital code groups, (2) synchronize the receiver decoding circuits, and (3) provide one bit of information, which may advantageously represent a positive or negative sign indicative of the polarity of an encoded analog sample represented by the adjacent, antecedent, group of digital bits. For example, if the signal to be encoded has both positive and negative excursions, the coded groups of digital bits may represent the magnitude of the signal with respect to some reference level without regard to the polarity of the signal at the moment, while the adjacent marker pulse which follows the code group may supply information as to whether the signal encoded is in its position or negative excursion at the moment the sample is taken.

The diphase marker signal generator at the transmitter may comprise, for example, a pulse generator which produces pulses of half the width of a bit pulse during the first half of each bit interval. The output of this generator may be connected by way of two normally blocked gate circuits to a common output lead of the pulse generator. One gate circuit has in series therewith a delay unit having a delay equal to one half of the mark interval. If a marker pulse of the type shown in interval 1 of waveform B is required the gate circuit having no delay in series therewith is activated for one bit interval. If a mark pulse of the type shown in interval 4 is required the gate circuit having the delay unit in series therewith is activated for one bit interval. If the mark signal is to represent the polarity of a subsequent group, it should be directly generated in response to an analog sample, and the encoded digital group may be simultaneously generated and combined with the mark signal after one-bit delay. If it is an antecedent group, the mark signal should be supplied immediately after the group is generated. Circuitry for so supplying the mark signal is discussed as part of our above-referenced copending application.

*Derived bipolar mark pulses—waveform G*

Figure 1:
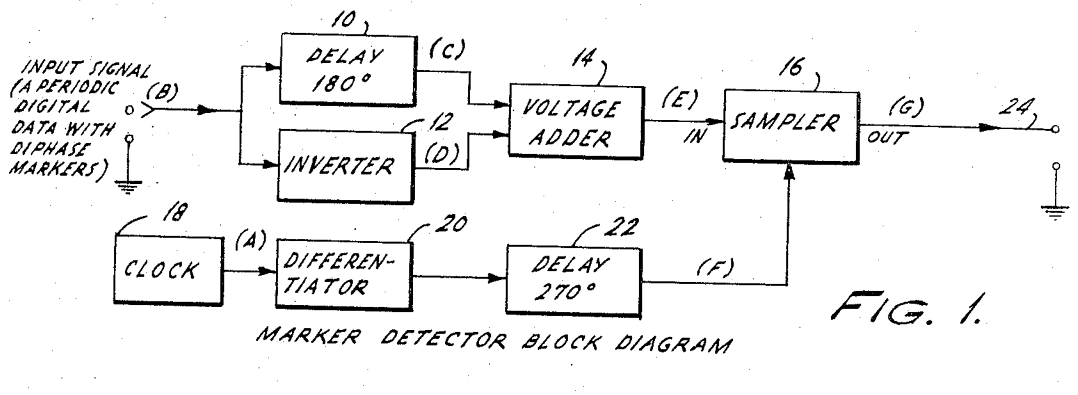
FIG. 1 is a block diagram of a marker pulse separator according to the invention.

The function of the circuit shown in FIG. 1 is to derive from the composite digital information signal of waveform B the bipolar mark pulses as shown in waveform G. These positive and negative channel markers are of a form which can be utilized by receiver synchronizing and decoding circuits, in conjunction with the information supplied by the code groups, to regenerate a signal representative of the signal originally transmitted, as will be apparent to those skilled in the art.

*Description of circuit*

The input signal of FIG. 2(B) is applied in parallel to a delay unit 10 and to an inverter 12. Delay unit 10 produces a time delay equal to one half of a period (180°) at the bit frequency. The delayed and inverted versions of the input signal are supplied to a voltage adder 14, the output of which is coupled to a normally nontransmissive sampler 16. Clock pulses from a clock pulse generator 18, which are synchronized with the incoming digital information signal, are supplied to a differentiator 20, the output of which is coupled to a delay unit 22. Clock pulse source 18, which generates the signal shown in waveform A, may be a slave oscillator which tends to run by itself at approximately the bit frequency but which is precisely synchronized with the bit frequency of the incoming signal, e.g., by comparing the phase of aperiodic unipolar spikes differentiated from the incoming signal with that of spikes differentiated from the clock pulses to generate a DC error signal which is fed back to correct the frequency of said slave oscillator. Delay unit 22 is arranged to provide a delay equal to three quarters of a period (270°) at the bit frequency. The output of the delay unit 22 is coupled to the interrogating or sample input of sampler 16. The separated bipolar marker pulses are supplied at output 24.

*Operation of circuit*

The operation of the marker detector of FIG. 1 will be explained with reference to the lettered voltage waveforms of FIG. 2, which are referenced at appropriate points in FIG. 1.

The composite input signal B is delayed by 180° or ½ cycle in delay unit 10, yielding signal C. Input signal B is also inverted in inverter 12, yielding signal D. Signals C and D are added in voltage adder 14 producing signal E, which, it will be observed, is bipolar in form.

Signal E is sampled at the frequency of the encoded bits during the latter half of each cycle in sampler 16 by the sampling pulses in waveform F. Waveform F can be derived from waveform A simply by differentiating the latter in differentiator 20 and delaying the differentiated clock pulses from ½ to 1 cycle (advantageously about ¾ cycle or 270°) in delay unit 22.

It will be observed that no change sample information is present in the derived channel markers of waveform G. This is so because synthesized waveform E can never contain channel sample information during the latter half of each numbered time interval thereof, which is when signal E is sampled.

As explained above, the novel marker signal of the invention is a single pulse of half the width of a channel sample pulse or bit, which can occupy either the first or last half of the bit cycle, according to whether a positive or negative polarity indication is desired. It is seen that the polarity of the mark pulses in waveform G corresponds with the encoded polarity of the mark signals in waveform B. The diphase marker does not increase the time-bandwidth-product of the basic signal as much as a marker with an increased amplitude characteristic, and its generation is easily effected at the transmitter.

The instant invention is not limited to the specificities of the foregoing description since many modifications thereof which fall within the true scope of the inventive concept will be apparent to those conversant with the art. The invention is defined only by the appended claims.

We claim:

1. In combination, (a) a source of a code modulated signal comprising variable-sized groups of digital bits separated by aperiodic mark intervals, each interval having the width of one of said digital bits and containing a pulse and a space of equal width,
(b) means for deriving a delayed version of said signal,
(c) means for deriving an inverted version of said signal,
(d) means for additively combining said versions to form a synthesized signal, and
(e) sampling means for periodically supplying a portion of said synthesized signal to an output terminal.

2. A system for detecting marker pulses in an aperiodic pulse code modulated composite signal which includes information intervals containing groups of pulses and spaces, each of a given duration, and mark intervals, containing a pulse and a space, each of half said given duration, comprising:

(a) means for delaying said composite signal by half said given duration,
(b) means for inverting said composite signal,
(c) means for additively combining the delayed and inverted versions of said composite signal to produce a synthesized signal, and
(d) means for sampling said synthesized signal during the latter half of each interval of said composite signal to produce bipolar marker output pulses.

3. The system of claim 2 wherein said means for sampling includes a source of clock pulses whose period is equal to said given width.

4. In combination, (a) a source of a composite signal which includes variable size sequential groups of digital bits, each bit having a given duration, said groups being separated by aperiodic mark intervals also of said given duration, each mark interval containing a pulse, and a space of equal width,
(b) means for delaying said composite signal for substantially half said given duration,
(c) means for inverting said composite signal,
(d) means for additively combining the delayed and inverted versions of said composite signal, to produce a synthesized signal, and (e) means for sampling said synthesized signal at intervals equal to said given duration so as to supply periodically to an output terminal a portion of said synthesized signal.

5. The combination of claim 4 wherein said synthesized signal is sampled during the latter half of each interval of said composite signal.

6. The combination of claim 5 wherein said sampling is effected by supplying said synthesized signal to a sampler which is also supplied with sampling pulses derived from a source of clock pulses whose period is equal to said duration.

References Cited

UNITED STATES PATENTS

| | | | |
|---|---|---|---|
| 3,008,124 | 11/1961 | Warnock | 178—66 X |
| 3,094,696 | 6/1963 | Zadoff | 340—170 X |
| 3,128,343 | 4/1964 | Baker | 340—170 X |
| 3,162,724 | 12/1964 | Ringelhaan | 178—68 |

NEIL C. READ, *Primary Examiner.*

THOMAS B. HABECKER, *Examiner.*

P. XIARHOS, D. YUSKO, *Assistant Examiners.*